US009689357B2

(12) United States Patent
Crawford

(10) Patent No.: US 9,689,357 B2
(45) Date of Patent: Jun. 27, 2017

(54) METHOD AND APPARATUS FOR IMPROVING ENGINE PERFORMANCE

(71) Applicant: Quirt Evan Crawford, Vista, CA (US)

(72) Inventor: Quirt Evan Crawford, Vista, CA (US)

( * ) Notice: Subject to any disclaimer, the term of this patent is extended or adjusted under 35 U.S.C. 154(b) by 0 days.

(21) Appl. No.: 14/496,803

(22) Filed: Sep. 25, 2014

(65) Prior Publication Data

US 2015/0136056 A1 May 21, 2015

Related U.S. Application Data

(60) Provisional application No. 61/905,038, filed on Nov. 15, 2013.

(51) Int. Cl.
*G01L 7/00* (2006.01)
*F02M 35/10* (2006.01)

(52) U.S. Cl.
CPC .. *F02M 35/10386* (2013.01); *F02M 35/1034* (2013.01); *F02M 35/10091* (2013.01); *Y10T 29/49817* (2015.01)

(58) Field of Classification Search
CPC ....... F02M 35/10386; F02M 35/10091; F02M 35/1034; Y10T 29/49817
USPC ..................... 123/184.21; 73/114.32, 114.34
See application file for complete search history.

(56) References Cited

U.S. PATENT DOCUMENTS 3,769,835 A 11/1973 Obermaier et al.
4,393,697 A * 7/1983 Sato et al. ................. 73/114.34
4,672,997 A 6/1987 Landis et al.
4,790,178 A * 12/1988 Usui et al. ................. 73/114.32
5,369,990 A 12/1994 Zurek et al.
5,467,648 A 11/1995 Igarashi et al.
5,693,879 A * 12/1997 Rilling et al. ............. 73/114.34
5,945,606 A * 8/1999 Tokunaga et al. .............. 73/756
6,006,610 A * 12/1999 Lehnert ...................... 73/862.08
6,070,462 A 6/2000 Igarashi et al.
6,539,786 B1 * 4/2003 Daly .......................... 73/114.32
6,598,472 B2 7/2003 Igarashi et al.
(Continued)

FOREIGN PATENT DOCUMENTS

DE 102005049026 A1 2/2007
JP 2000002574 A 1/2000
(Continued)

OTHER PUBLICATIONS

International Search Report and Written Opinion, issued on Feb. 25, 2015, in international application No. PCT/US2014/065178, 13 pgs.
(Continued)

*Primary Examiner* — Marguerite McMahon
(74) *Attorney, Agent, or Firm* — Karen B. Tripp

(57) ABSTRACT

A method of modifying an engine after the engine has been initially sold by the manufacturer of the engine, wherein the engine has an air intake pipe and an air flow sensor, wherein the air intake pipe has an exterior wall surface and an interior wall surface, and wherein the air flow sensor has a sensing head disposed at a first location within the air intake pipe spaced apart from the interior wall surface of the air intake pipe, includes the step of: repositioning the sensing head from the first location to a second location, wherein the second location is closer to the interior wall surface of the air intake pipe than the position of the sensing head at the first location.

12 Claims, 2 Drawing Sheets

(56) References Cited

U.S. PATENT DOCUMENTS

| | | | | |
|---|---|---|---|---|
| 6,655,207 | B1 | 12/2003 | Speldrich et al. | |
| 6,920,784 | B2 * | 7/2005 | Abdolhosseini et al. | 73/114.32 |
| 6,941,807 | B2 * | 9/2005 | Frie et al. | 73/204.21 |
| 6,973,912 | B1 * | 12/2005 | Shimatsu et al. | 123/339.1 |
| 7,302,843 | B2 | 12/2007 | Bender | |
| 7,631,562 | B1 | 12/2009 | Speldrich | |
| 7,681,461 | B2 * | 3/2010 | Rosenbaum | F02D 41/18 73/861.52 |
| 8,397,586 | B2 | 3/2013 | Sorenson et al. | |
| 2009/0095069 | A1 | 4/2009 | Lang et al. | |
| 2010/0018400 | A1 * | 1/2010 | Dirnberger | 96/422 |
| 2010/0270071 | A1 * | 10/2010 | Plankell | H02G 3/126 174/502 |
| 2011/0226053 | A1 | 9/2011 | Sorenson et al. | |
| 2011/0247411 | A1 | 10/2011 | Speldrich | |

FOREIGN PATENT DOCUMENTS

| | | | |
|---|---|---|---|
| JP | 2002061526 | A | 2/2002 |
| JP | 2003329495 | A | 11/2003 |

OTHER PUBLICATIONS

International Preliminary Report on Patentability, issued on Feb. 19, 2016, in international application No. PCT/US2014/065178, 5 pgs.

* cited by examiner

AIR CLEANER
ENGINE BLOCK

METHOD AND APPARATUS FOR IMPROVING ENGINE PERFORMANCE

RELATED APPLICATION

This application claims priority from U.S. Patent Application Ser. No. 61/905,038, entitled "Method and Apparatus for Improving Engine Performance," filed Nov. 15, 2013, the entirety of which is incorporated herein by reference.

BACKGROUND OF THE INVENTION

Many automobiles contain mass air flow sensors. Mass air flow sensors are used to determine the mass flow rate of air entering a fuel-injected internal combustion engine. The data that the mass air flow sensor gathers is processed by the engine control unit, which then determines the proper air to fuel ratio necessary for the engine to run at its most efficient level for factory settings.

Most mass air flow sensor heads are located in the air intake pipe of the engine, and are typically placed to read the flow of air flowing through the middle of the pipe. Using this typical depth of penetration of the mass air flow sensor head, most automobile manufacturers have designed their engine control units to operate the engines at approximately 80% efficiency. This means there is a large gap left between the capacity the engines are currently running at, and where their optimal performance could be. If they were running at a higher efficiency percentage, the engines could be running even more efficiently, effectively increasing miles per gallon, increasing power, reducing emissions and reducing fuel consumption.

Several attempts have been made to address this issue, but they all involve the internal modification of the air intake pipe, and tend to be complex, unreliable and expensive—both to build and to install.

Accordingly, there is a need for an aftermarket way to improve engine efficiency while avoiding the aforementioned deficiencies and disadvantages of the prior art.

SUMMARY OF THE INVENTION

The invention avoids the aforementioned problems in the prior art. In one aspect, the invention is a method of modifying an engine after the engine has been initially sold by the manufacturer of the engine, the engine having an air intake pipe and an air flow sensor, the air intake pipe having an exterior wall surface and an interior wall surface, the air flow sensor having a sensing head disposed at a first location within the air intake pipe spaced apart from the interior wall surface of the air intake pipe, the method comprising the step of: repositioning the sensing head from the first location to a second location, the second location being closer to the interior wall surface of the air intake pipe than the position of the sensing head at the first location.

In a second aspect, the invention is an aftermarket product for increasing engine efficiency by modifying the depth of penetration of the mass air flow sensor into the air intake pipe. In this aspect, the invention is an air intake pipe and air flow sensor combination wherein the air intake pipe has an exterior wall surface and an interior wall surface. The air flow sensor has a body and a sensing head. The sensing head is attached to and extends away from the body, and the sensing head is disposed within the air intake pipe spaced apart from the interior wall surface of the air intake pipe. The combination further comprises a spacer disposed between the air flow sensor body and the exterior surface of the air intake pipe.

DRAWINGS

These and other features, aspects and advantages of the present invention will become better understood with reference to the following description, appended claims, and accompanying drawings where:

DETAILED DESCRIPTION OF THE INVENTION

Figures 1A, 1B, 2A, 2B:
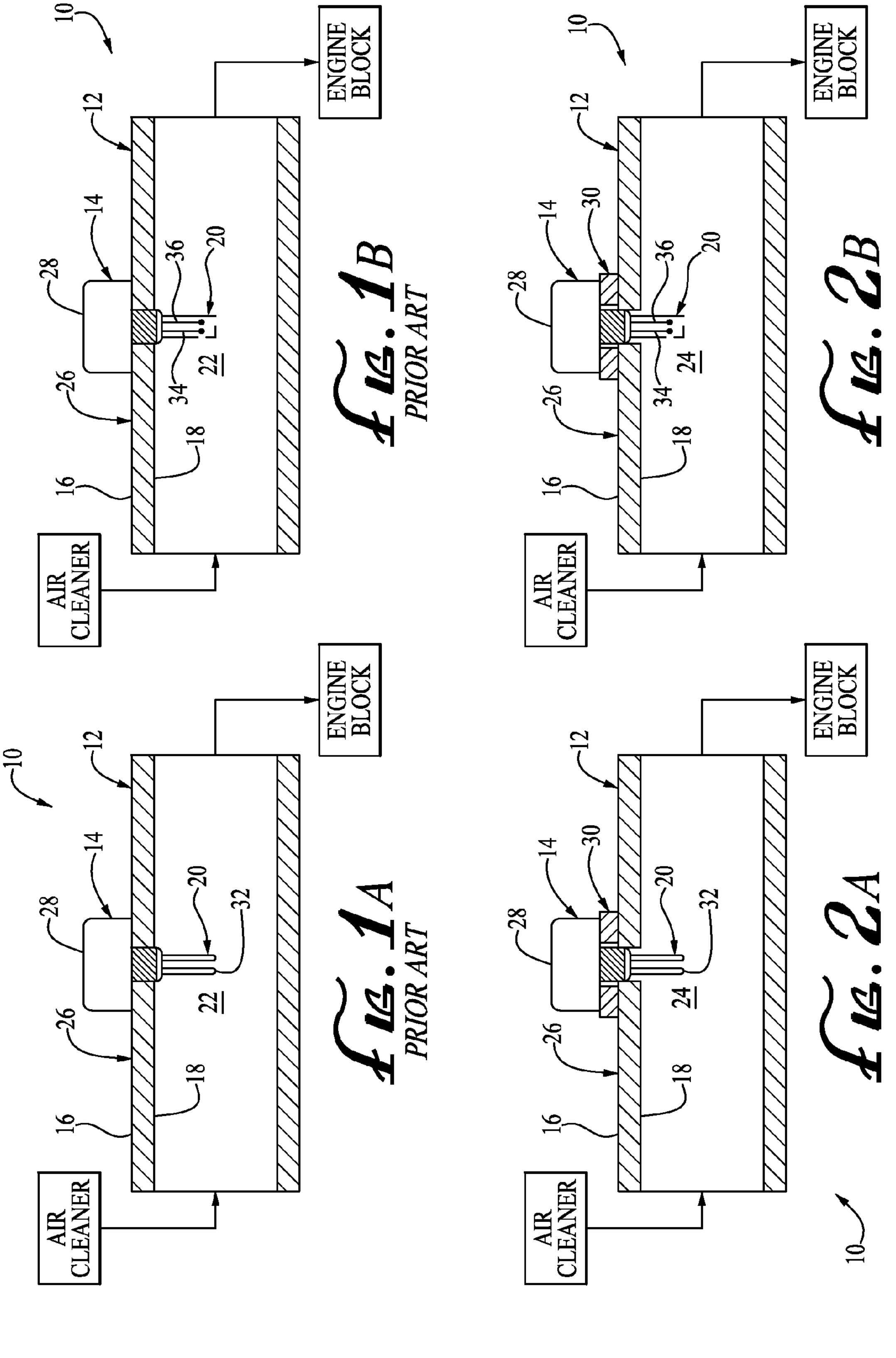
FIG. 1A PRIOR ART
FIG. 1B PRIOR ART
FIG. 1A is a cross-sectional diagram of a first air intake pipe and air flow sensor combination of the prior art.
FIG. 1B is a cross-sectional diagram of a second air intake pipe and air flow sensor combination of the prior art.
FIG. 2A is a cross-sectional diagram of a first air intake pipe and air flow sensor combination having features of the invention.
FIG. 2B is a cross-sectional diagram of a second air intake pipe and air flow sensor combination having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

DEFINITIONS

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

THE INVENTION

In one aspect, the invention is a method of modifying an engine 10 after the engine 10 has been initially sold by the manufacturer of the engine 10. The invention is applicable to an engine 10 which has an air intake pipe 12 and an air flow sensor 14. The air intake pipe 12 has an exterior wall surface 16 and an interior wall surface 18. The air flow sensor 14 has a sensing head 20 disposed at a first location 22 within the air intake pipe 12, spaced apart from the interior wall surface 18 of the air intake pipe 12. The method comprises the step of: repositioning the sensing head 20 from the first location 22 to a second location 24, wherein the second location 24 is closer to the interior wall surface 18 of the air intake pipe 12 then the first location 22.

In another aspect, the invention is an aftermarket product for increasing engine efficiency by modifying the depth of penetration of the air flow sensor 14 into the air intake pipe 12. In this aspect, the invention is an air intake pipe and airflow sensor combination 26. The air intake pipe 12 has an exterior wall surface 16 and an interior wall surface 18. The air flow sensor 14 has a body 28 and a sensing head 20. The sensing head 20 is attached to and extends away from the body 28, and the sensing head 20 is disposed within the air intake pipe 12 at a first location 22, spaced apart from the interior wall surface 18 of the air intake pipe 12. In this aspect of the invention, the combination 26 further comprises a spacer 30 disposed between the air flow sensor body 28 and the exterior surface 16 of the air intake pipe 12.

In the drawings, FIG. 1A illustrates of first air flow sensor 14 wherein the sensing head 20 comprises a pair of sensing elements 32. FIG. 1B illustrates a second air flow sensor 14 wherein the sensing head 20 comprises an air scoop 34 having a heated sensing wire 36.

As illustrated in FIGS. 1A and 1B, it is typical for the air flow sensor 14 to be disposed at right angles to the air intake pipe 12. The body 28 of the air flow sensor 14 is positioned against the exterior wall surface 16 of the air intake pipe 12 and the sensing head 20 of the air flow sensor 14 penetrates into the central portion of the air intake pipe 12, wherein the intake air flows in generally turbulent fashion at a velocity representative of the vast majority of the flowing intake air.

As noted above, the method of the invention is to reposition the sensing head 22 to a second location 24 closer to the interior wall surface 18 of the air intake pipe 12. At such second location 24, the sensing head 20 is contacted by intake air flowing within the air intake pipe 12 in a more laminar fashion and at a velocity somewhat slower than the intake air flowing in the central portion of the air intake pipe 12.

Accordingly, as shown in FIGS. 2A and 2B, the method of the invention places a spacer 30 in between the exterior wall surface 16 of the air intake pipe 12 and the body 28 of the air flow sensor 14. The spacer 30 is dimensioned such that the sensing head 20 of the airflow sensor 14 penetrates less farther into the air intake pipe 12 to assure that the sensing head 20 of the air flow sensor 14 is located within flowing intake air having a velocity less than the velocity of flowing intake air near the center of the air flow pipe 12.

For a large majority of automobile and small truck combination engines 10, engine efficiency can be significantly increased by repositioning the sensing head 20 of the air flow sensor 14 to a second position which is 0.7 inches-0.9 inches, e.g., about 0.8 inches, closer to the interior wall surface 18 of the air intake pipe 12.

Preferably, the repositioned distance of the sensing head 20 is determined on an engine by engine basis, where, for example, an exemplar of each engine model or engine class is tested with a dynamometer to determine an ideal air-to-fuel ratio for that engine model or engine class.

The invention causes changes in the air fuel ratio and ignition timing of the engine 10 by manipulating the voltage from the sensing head to the engines control unit. For example, use of the invention can change the air fuel ratio from 12.6 to 1 at full throttle to about 13.1 to 1, resulting in less fuel going into the engine 10 at full throttle, thus increasing fuel mileage, reducing emissions and increasing power. The Invention also results an advancement of ignition timing which further results in an increase in power and fuel mileage and a reduction in tailpipe emissions.

Figure 3:
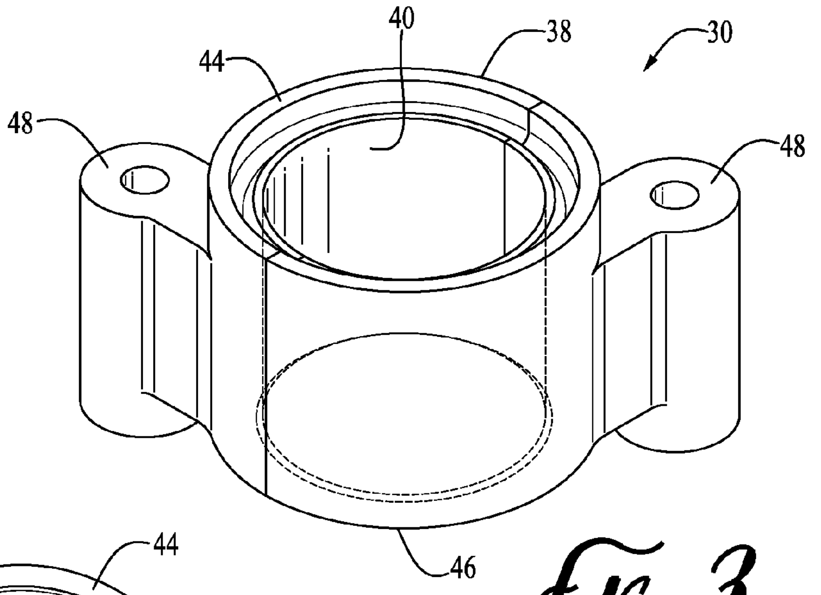
FIG. 3 is a perspective view of a spacer usable in the invention.
Figure 4:
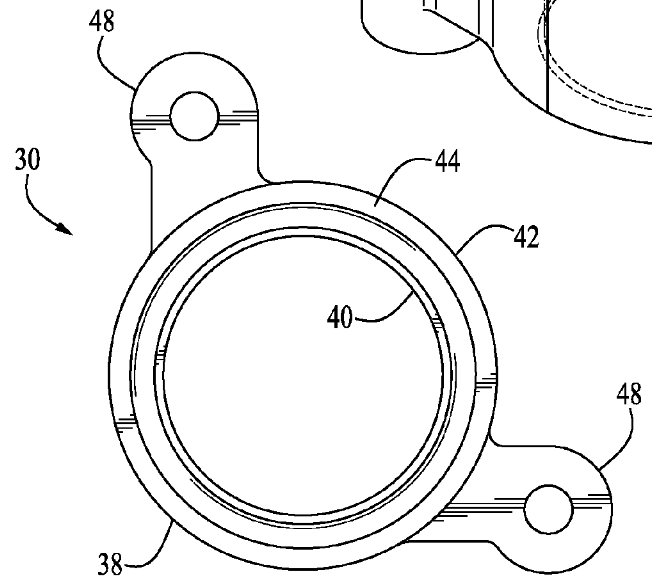
FIG. 4 is a top view of the spacer illustrated in FIG. 3.
Figure 5:
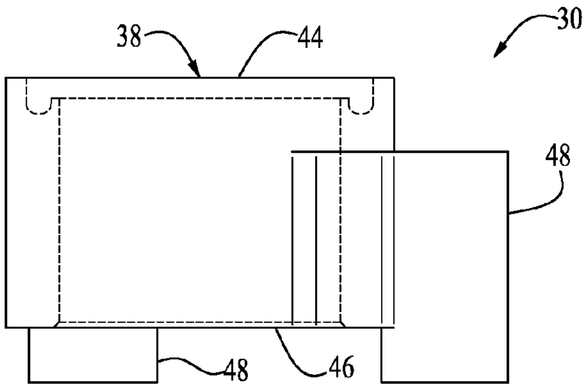
FIG. 5 is a side view of the spacer illustrated in FIG. 3.

In the embodiment illustrated in FIGS. 3-5, the spacer 30 of the invention comprises a central circular cylinder 38 dimensioned to line up with the exterior of the air flow sensor 14 and the air flow sensor body 28. The central cylinder 38 has an inner surface 40, an outer surface 42, an upper surface 44 and the lower surface 46. The spacer 30 has a pair of attachment cylinders 48 attached to the outer surface 42 of the central cylinder 38. The attachment cylinders 48 are located, dimensioned and configured to connect between the body 28 of the air flow sensor 14 and the air intake pipe 12, preferably, without modification to the body 28 or the air intake pipe 12.

As noted above, the reason for the modification of the depth of penetration of the sensor head 20 of the airflow sensor 14 is that the stock depth has the sensor 14 reading the air flow through the middle of the airflow pipe 12, which is where the highest volume of air travels. By re-locating the sensor head 20 closer to the interior wall surface 18 of the air intake pipe 12, the sensor head 20 reads a lower volume of air flow. Since the sensor 14 remains set at the factory settings, by relocating the sensor head 20 to a lower volume of airflow, the engine 10 control unit is led to believe that the amount of air entering the engine 10 is less. The engine 10 control unit therefore adjusts the air to fuel ratio in response to the lower perceived volume of air flow. This results in approximately 5% more performance from the engine 10 with almost no modification. Prior to the installation of the spacer 30, the engine 10 typically can operate at approximately 80% efficiency. After installation of the spacer 30, the same engine 10 can typically operate at approximately 90% efficiency. This means less fuel consumption, better gas mileage, lower emissions and more power from the engine 10.

Having thus described the invention, it should be apparent that numerous structural modifications and adaptations may be resorted to without departing from the scope and fair meaning of the instant invention as set forth herein above and described herein below by the claims.

What is claimed is:

1. A method of modifying an engine having an air intake pipe and an air flow sensor adapted to communicate with an engine control unit for adjusting air to fuel ratio fed to an engine block, the air intake pipe adapted to transport a flow of air from an air cleaner to the engine block, the flow of air through the air intake pipe having a higher velocity proximate the center of the air intake pipe, and a lower velocity proximate an interior wall surface of the air intake pipe, the air flow sensor having a sensor head, the air flow sensor extending into the air intake pipe through a stock opening in an exterior wall surface of the air intake pipe, and the air flow sensor positioned to a stock depth, such that the sensor head is adapted to read the higher velocity of the air flow proximate the center of the air intake pipe;

the method of modifying the engine provided for modifying after the engine has been sold by the manufacturer of the engine, the method comprising the steps of:

removing the air flow sensor from the stock opening of the air intake pipe;

positioning a spacer on an exterior wall surface of the air intake pipe over the stock opening, the spacer having an annulus sized for receiving the air flow sensor; and reinstalling the air flow sensor into the air intake pipe, through the annulus in the spacer, to a modified depth in the air intake pipe less than the stock depth, so that the sensor head is positioned to read the lower velocity of the air flow proximate the interior wall surface of the air intake pipe, whereby the engine control unit adjusts the air to fuel ratio in response to the lower velocity reading, thereby causing the engine to operate at a higher efficiency as compared to operation of the engine having the air flow sensor positioned at the stock depth.

2. The method of modifying an engine according to claim 1, wherein the distance between the stock depth and the modified depth of the air sensor is in a range from 0.7 inches to 0.9 inches.

3. The method of modifying an engine according to claim 1, wherein the distance between the stock depth and the modified depth of the air sensor is 0.8 inches.

4. The method of modifying an engine according to claim 1, wherein a set of conditions resulting in the engine control unit adjusting the air to fuel ratio to a value of 12.6:1 when the air sensor is set at the stock depth, results in a modified air to fuel ratio of at least 13.1:1 when the air sensor is set at the modified depth.

5. The method of modifying an engine according to claim 1, wherein the efficiency of the engine is at least 5% higher as compared to operation of the engine having the air flow sensor positioned at the stock depth.

6. The method of modifying an engine according to claim 1, wherein the efficiency of the engine is at least 10% higher as compared to operation of the engine having the air flow sensor positioned at the stock depth.

7. An engine modified according to the method of claim 1.

8. An engine modified according to the method of claim 2.

9. An engine modified according to the method of claim 3.

10. An engine modified according to the method of claim 4.

11. An engine modified according to the method of claim 5.

12. An engine modified according to the method of claim 6.

* * * * *